(Model.)
G. GIERSBERG & R. WIRTH.
ORNAMENTING SURFACES OF WALLS, CEILINGS, PAPER HANGINGS, &c.
No. 283,595. Patented Aug. 21, 1883.
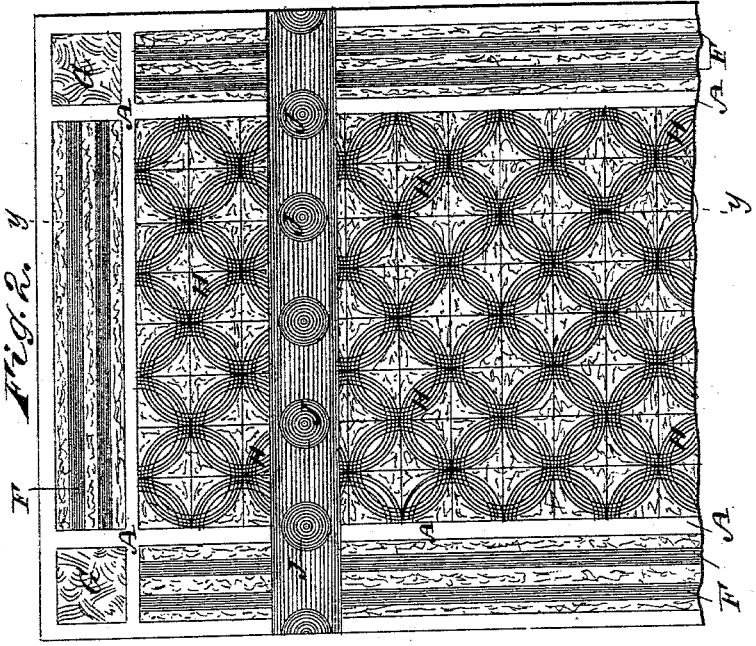
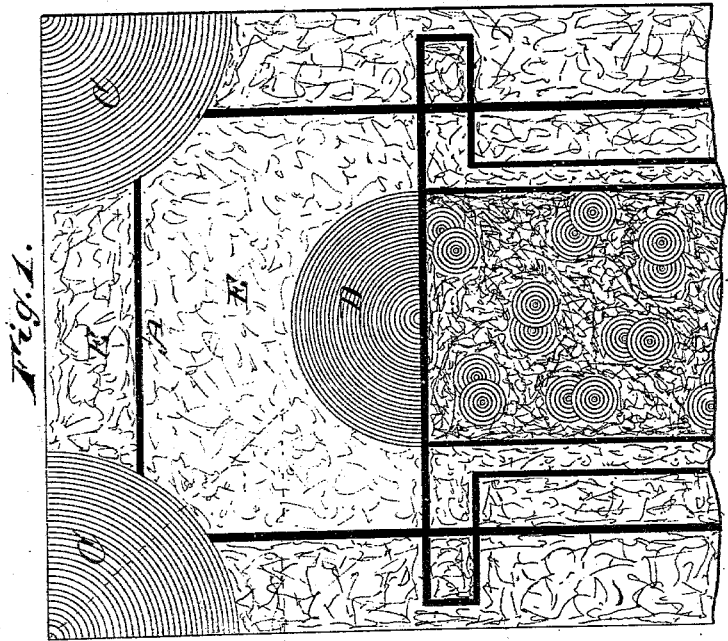
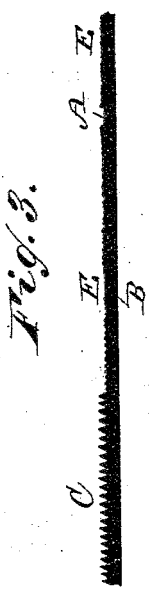
WITNESSES:
INVENTOR:
G. Giersberg
R. Wirth
BY Munn & Co
ATTORNEYS.

UNITED STATES PATENT OFFICE.

GUSTAV GIERSBERG AND RICHARD WIRTH, OF NEW YORK, N. Y.

ORNAMENTING SURFACES OF WALLS, CEILINGS, PAPER-HANGINGS, &c.

SPECIFICATION forming part of Letters Patent No. 283,595, dated August 21, 1883.

Application filed May 24, 1883. (Model.)

*To all whom it may concern:*

Be it known that we, GUSTAV GIERSBERG and RICHARD WIRTH, of the city, county, and State of New York, have invented certain new and useful Improvements in Ornamenting Surfaces of Walls, Ceilings, Paper-Hangings, &c., of which the following is a full, clear, and exact description.

The object of our invention is to provide certain new and useful improvements in the art of ornamenting surfaces in relief, such as walls, ceilings, panels, paper-hangings, wall-coverings, lambrequins, &c.

The invention consists in applying a thin layer of a plastic mass on the surface to be ornamented, and then producing relief ornaments of various designs in the said plastic mass by means of combs or other suitable implements, as will be fully set forth hereinafter.

Reference is to be had to the accompanying drawings, forming a part of this specification, in which similar letters of reference indicate corresponding parts in all the figures.

Figures 1 and 2 show two specimens of our improved ornamentation. Figs. 3 and 4 are cross-sectional views on the lines $x\,x$ and $y\,y$ on the Figs. 1 and 2, respectively.

In carrying out our invention we prepare a plastic mass or paste composed of white lead, about three parts; whiting, two and one-half parts; plaster-of-paris, four parts, and oil turpentine or other drier and the desired color in the necessary quantities to make a paste which is not too thick or stiff and not too fluid. The said plastic mass is applied and spread by means of a brush, trowel, or other suitable implement on the surface to be ornamented. The thickness of the layer of plastic mass can be varied, but is generally made one thirty-second of an inch thick. The layer of paste or plastic mass is then grained by means of steel combs of various degrees of fineness. The lines or grainings made in the mass by means of the comb can be regular circular lines, straight or wavy lines, &c.; or the surface of the plastic mass can be roughened by means of a sponge pressed on the same, or by means of a stylus or a roughened plate, &c. Lines of any desired width can be formed in the plastic mass by removing the plastic mass from the surface being ornamented; or raised lines can be formed by giving the plastic layer a greater thickness at certain points. Ornaments of paper, pasteboard, leather, &c., punched or cut out of sheets, can be embedded in the plastic mass. The plastic mass can be applied on paper, fabric, wood, metal, plaster, &c. The ornaments, which are all made by hand, can be varied as much as may be desired, and appear in flat relief on the surface on which the mass is applied. Plastic masses of different colors can be applied on different parts of the surface, whereby varied, handsome, and pleasing effects can be produced.

Referring to Fig. 1, A are sunken lines in the plastic mass spread on a surface, B. The corner ornaments, C, and the end ornaments, D, are produced by means of a steel comb turned around one point, the teeth of the comb forming the quadrant or semicircular grooves. The part E is roughened by means of a sponge, stylus, &c.

Referring to Fig. 2, F F are straight lines drawn in the plastic mass by means of a steel comb. The vermiculated ornament G is produced by means of a stylus. The circles H and J are produced by means of steel combs of different patterns and of different degrees of fineness.

The plastic mass hardens very soon, is not affected by moisture, heat, &c., does not crack or blister, and permits of ornamenting according to any design, either plain or rich.

Having thus described our invention, we claim as new and desire to secure by Letters Patent—

1. The method, substantially as herein described, of ornamenting surfaces, consisting in applying a thin layer of a plastic mass or paste on the surface and producing relief ornaments in the said mass by means of steel combs and other suitable implements, as set forth.

2. The herein-described improvement in the art of ornamenting surfaces, consisting in applying a thin layer of a mixture of white lead, whiting, plaster-of-paris, oil, and a drier on the surface to be ornamented, and then producing relief ornaments in the said layer, which is plastic, by means of combs or other suitable implements, substantially as set forth.

GUSTAV GIERSBERG.
RICHARD WIRTH.

Witnesses:
OSCAR F. GUNZ,
C. SEDGWICK.